MAGNETIC SHIFT REGISTER WITH STATIC READOUT

Filed April 3, 1963 4 Sheets-Sheet 1

INVENTOR.
RICHARD L. SNYDER,
BY
Walter J. Adam
ATTORNEY.

Jan. 30, 1968 R. L. SNYDER 3,366,936

MAGNETIC SHIFT REGISTER WITH STATIC READOUT

Filed April 3, 1963 4 Sheets-Sheet 2

INVENTOR.
RICHARD L. SNYDER,
BY
Walter J. Adam
ATTORNEY.

MAGNETIC SHIFT REGISTER WITH STATIC READOUT

Filed April 3, 1963 4 Sheets-Sheet 4

INVENTOR.
RICHARD L. SNYDER,
BY
Walter J. Adam
ATTORNEY.

United States Patent Office 3,366,936

Patented Jan. 30, 1968

3,366,936

MAGNETIC SHIFT REGISTER WITH STATIC READOUT

Richard L. Snyder, Fullerton, Calif., assignor to Hughes Aircraft Company, Culver City, Calif., a corporation of Delaware Filed Apr. 3, 1963, Ser. No. 270,440
8 Claims. (Cl. 340—174)

This invention relates to magnetic memory systems and particularly to a magnetic shift register system that provides static reading of shifted binary information.

Magnetic shift register memories utilizing the principle of shifting magnetic domain regions along a magnetic medium such as taught in Patent No. 2,919,432, "Magnetic Device," by Kent D. Broadbent, provide reliable storage of large amounts of binary information. These shift register memories generally record magnetic domains at a first end of a magnetic medium, propagate the magnetic domains to a second end of the medium and sense the presence of domain walls as they are propagated past a sense coil. In some arrangements it would be highly desirable if the stored information could be read when the magnetic domains are static, that is shifting is not being performed. Also, it would be advantageous to be able to determine the stored binary information in any portion of the register without the magnetic domains being advanced from desired positions. For example, in a complex function generator, it would be desirable to be able to selectively interrogate information in predetermined positions of a shift register memory without shifting the position of any of the stored information.

It is therefore an object of this invention to provide an arrangement to statically read binary information stored in a magnetic medium.

It is another object of this invention to provide a shift register system that allows reading of stored binary information in the magnetic medium without advancing the stored magnetic domains.

It is still another object of this invention to provide a static read out system for utilization with a memory in which information is stored by shifting magnetic domains serially through the medium.

It is a further object of this invention to provide an arrangement for a system utilizing two parallel magnetic mediums for propagating magnetic domains therethrough, in which the binary state of stored magnetic domains can be interrogated without propagation of the magnetic domains.

Briefly in accordance with the invention, a coil is positioned at a selected position adjacent to a magnetic medium along which magnetic domains are serially propagated by driving conductors. The position may be selected between a pair of propagating conductors at which magnetic domain walls representative of a stored binary state may be positioned at the end of a propagating cycle. The magnetic domains may be arranged so that the presence or absence of a domain wall respectively represent first or second binary states. To interrogate the stored information, an AC (alternating current) signal is applied to the coil and a frequency sensitive circuit responds to the inductive impedance developed by the coil. The difference in impedance provided by the presence and absence of a domain wall controls the frequency sensitive circuit to provide signals that may be detected to indicate the stored binary state. Also, in accordance with the invention, the AC field may be applied to the magnetic domains through the propagating conductors or through separate conductors to provide the impedance change to be detected.

The novel features of this invention, both as to its organization and method of operation, will best be understood from the accompanying description, taken in connection with the accompanying drawings, in which like reference characters refer to like parts, and in which.

Figure 1:
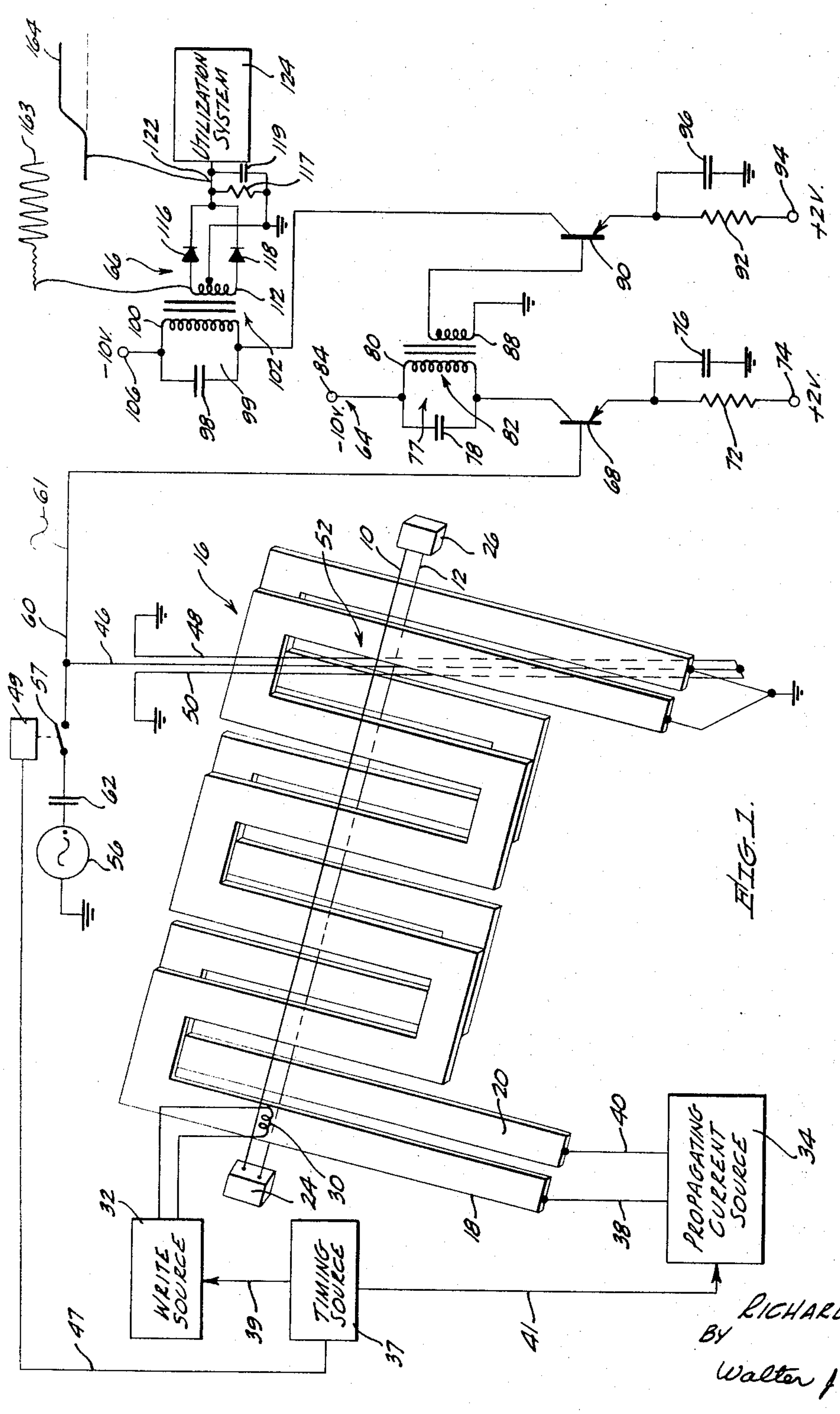
FIG. 1 is a partially perspective circuit and block diagram of a shift register with a static read out system in accordance with the invention.

Referring first to the shift register system of FIG. 1, magnetic wires 10 and 12 are positioned adjacent to each other on opposite sides of a polyphase driving array 16 including first and second conductors 18 and 20. The wires 10 and 12 may be slightly offset from each other relative to a vertical plane. Also, the wires 10 and 12 may be a ferromagnetic material such as a material including nickel and iron longitudinally oriented. The array 16 may be arranged in a conventional two phase propagating or driving arrangement with the conductor 20 alternately leading and lagging the conductor 18. The conductors 18 and 20 are of any suitable conducting material such as copper or aluminum and may have rectangular cross sections.

The magnetic wires 10 and 12 are of a magnetic material having hysteresis characteristics such that substantially more magneto-motive force is required to nucleate or establish a magnetic domain (that is, to establish a domain wall of a polarity opposite to that previously established in the material) than is required to propagate or shift the magnetic domain wall along the material. Thus, the B—H hysteresis loop has a shape of a relaxing square loop with the portions parallel to the B or magneto-motive force axis extending to relatively large values of magneto-motive force and rapidly decreasing to relatively small values of magneto-motive force in the region of change between the positive and negative values of flux density B. This type of hysteresis characteristic is required in order to discriminate between the domain forming field and the propagating field and allow propagation without destroying information. It is to be noted that this material would present a rectangular hysteresis loop on a conventional loop tracer apparatus because the material would resist switching until nucleation, and the domain wall would then expand in response to the nucleating field. A desirable hysteresis characteristic may be provided by maintaining the magnetic wires 10 and 12 under stress such as tension, which for some metals may be substantially at the yield point. The longitudinal tension provides magnetic orientation along the longitudinal axis of the wires 10 and 12 which provides the desired hysteresis characteristic as discussed above. Tension may be provided in the wires 10 and 12 by suitable anchor points such as 24 and 26 which may, for example, be pins. It is to be noted that wires of certain materials and mechanical histories may not require tension to provide the required orientation.

When a positive magneto-strictive material is utilized, that is, a material that increases in length along the longitudinal or easy axis of magnetization when magnetized, the desired longitudinal orientation is provided by longitudinal tension. For a negative magneto-strictive material, that is, a material which decreases its length along the longitudinal axis of easy axis of magnetization when magnetized, the desired longitudinal orientation is provided by longitudinal compression. Also, in accordance with this invention, other suitable magnetic mediums may be utilized such as oriented thin film materials. A requirement for operation is that the magnetic material such as the wires 10 and 12 have a substantially larger longitudinal dimension than the width.

Figure 2:
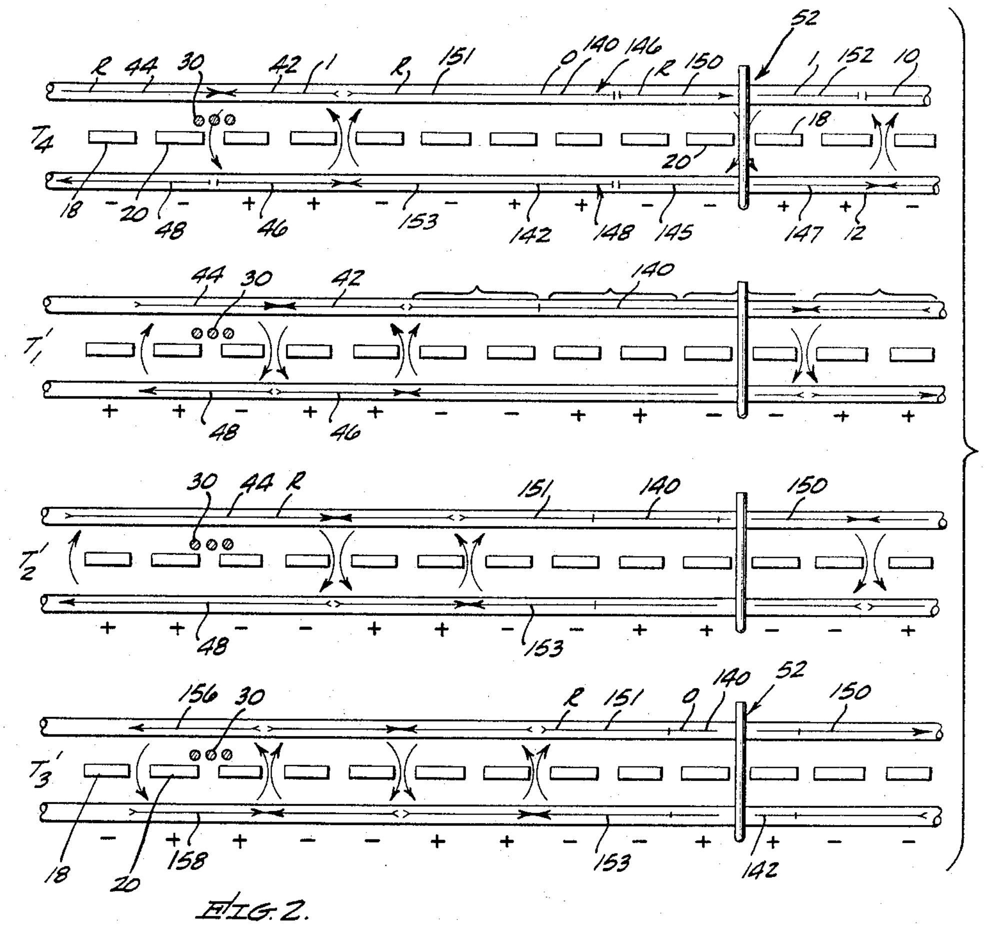
FIG. 2 is a schematic diagram of magnetic wires for explaining the operation of the shift register of FIG. 1.

To establish magnetic domains in the magnetic wires 10 and 12, a write coil 30 is provided at a position between the wires 10 and 12 and coupled to a writing source 32 which applies writing currents in selected directions through the coil 30. A source of propagating currents 34 applies polyphase driving current pulses through leads 38 and 40 to respective conductors 18 and 20, the other ends thereof being coupled to a suitable source of reference potential such as ground. The propagating arrangement may be similar to that disclosed in Patent No. 2,919,432. A source of timing signals 37 controls the writing operation through a lead 39 and controls the timing of the source of propagating current 34 through a lead 41. A timing signal for static reading is applied from the source 37 through a lead 47 to a switch control circuit 49. The magnetic domains such as 42, 44, 46 and 48 of FIG. 2 are established by the write coil 30 and propagated along the wires 10 and 12 to predetermined static storage positions.

Figure 4:
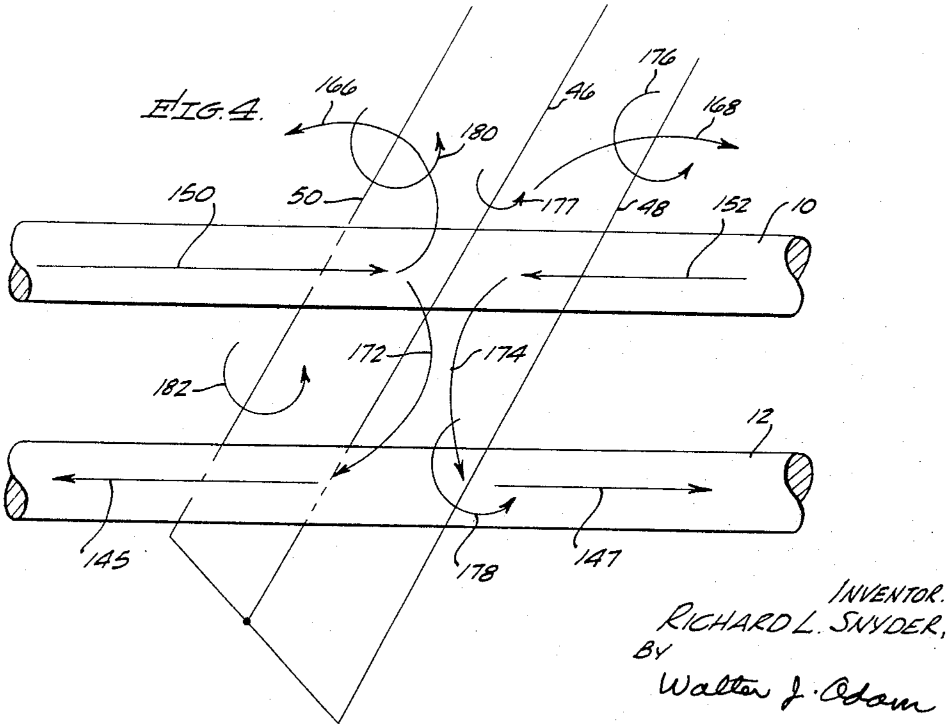
FIG. 4 is a detailed perspective drawing of the wires and the static sense coil of the system of FIG. 1 in accordance with the invention.

A static readout arrangement in accordance with the invention includes a lead 46 positioned between the magnetic wires 10 and 12 and joined to wires 48 and 50, as may also be seen in FIG. 4, which pass or are adjacent to opposite sides of the wires 10 and 12. The wires 48 and 50 are coupled at the ends to a suitable source of reference potential such as ground. Thus, the wires 46, 48 and 50 form a coil 52 that is magnetically coupled to the magnetic wires 10 and 12. The lead 46 is coupled to an AC (alternating current) source 56 through a lead 60, a switch 57 and a capacitor 62. The AC source 56 which may be a constant current source and have a selected frequency between 50 kilocycles and 10 megacycles, is coupled to a suitable source of reference potential such as ground. It is to be noted that the capacitor 62 may be for coupling or may have a value selected to provide a parallel resonant circuit with the inductance of the coil 52 when a domain wall is present. In the arrangement shown, the AC source 56 may be a constant voltage source when the capacitor 62 is selected to provide a resonant circuit. When the source 56 is a constant current source and the capacitor 62 is selected as a resonant element, the capacitor 62 may be coupled between the leads 48 and 50 and the lead 60.

In response to the impedance on the lead 46, the AC current signal passing to ground through the coil 52 develops an AC voltage signal which is applied from the lead 60 to a tuned amplifier 64 and in turn to a detector 66. The tuned amplifier 64 may include a pnp type transistor 68 having a base coupled to the lead 60 and an emitter coupled through a resistor 72 to a suitable source of potential such as a +2 volt terminal 74. The emitter of the transistor 68 is also coupled to ground through a by-pass capacitor 76. The collector of the transistor 68 is coupled to a parallel resonant circuit 77 including a capacitor 78 and a winding 80 of a transformer 82 which in turn are coupled to a suitable source of potential such as a −10 volt terminal 84. The parallel resonant circuit 77 is a conventional arrangement to develop an impedance at the tuned frequency. A secondary winding 88 of the transformer 82 has one end coupled to ground and the other end coupled to the base of a pnp type transistor 90 of a second stage of the tuned amplifier 64.

The emitter of the transistor 90 is coupled through a resistor 92 to a suitable source of potential such as a +2 volt terminal 94 as well as being coupled to ground through a by-pass capacitor 96. The collector of the transistor 90 is coupled to a tuned parallel resonant circuit 99 including a parallel coupled capacitor 98 and a winding 100 of a transformer 102 which in turn are coupled to a suitable source of potential such as a −10 volt terminal 106. The two tuned circuits 77 and 99 coupled to the collectors of the transistors 68 and 90 are tuned substantially at the frequency of the oscillator or source of AC signals 56 to provide a required impedance.

A secondary winding 112 of the transformer 102 has a center tap coupled to ground and opposite ends coupled to the anodes of diodes 116 and 118 which form the amplitude detector circuit 66. The cathodes of the diodes 116 and 118 are coupled to a lead 122 which in turn is coupled through a resistor 117 and a capacitor 119 to ground. The lead 122 is coupled to a utilization system 124 which may be a computer logical control system, for example.

Figure 3:
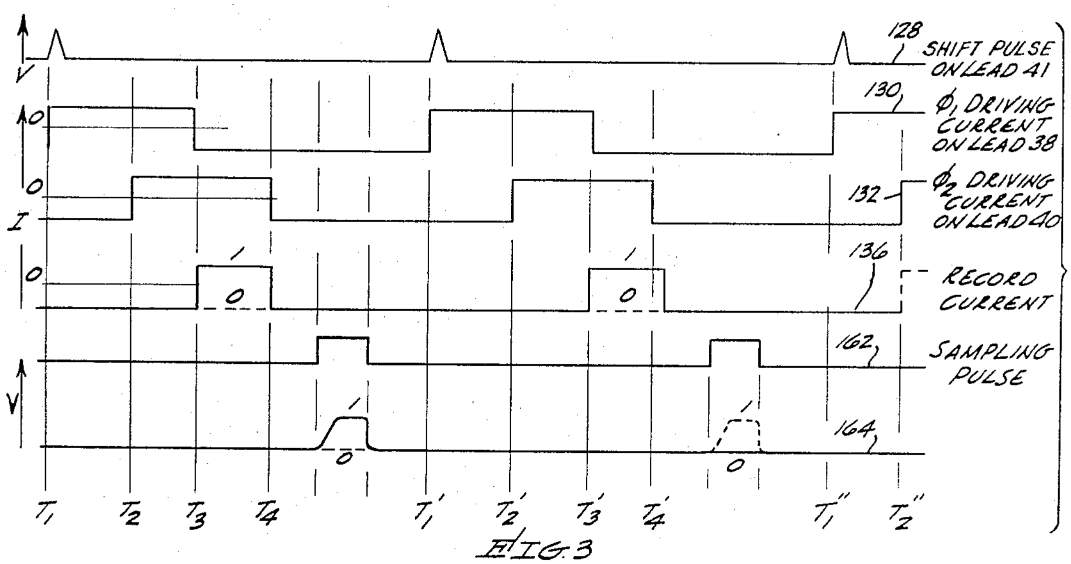
FIG. 3 is a schematic diagram of waveforms for further explaining the operation of the system of FIG. 1.

Referring now to the diagram of FIG. 2 and to the waveforms of FIG. 3 as well as to FIG. 1, a shift pulse of a waveform 128 may be applied through the lead 41 to initiate a four phase driving cycle in which current pulses of waveforms 130 and 132 are applied to the conductors 18 and 20. For convenience of explanation, the domain propagation will be explained principally between times $T_4$ and $T_3'$. At time $T_4$, a binary "one" has been previously recorded in the wires 10 and 12 in response to the pulse of a waveform 136 as shown by the arrows 42 and 46. The magnetic domains of the arrows 42 and 46 are complementary to each other and form a substantially closed magnetic path. The complementary wire arrangement has the advantage that the substantially closed magnetic paths allow magnetic domains to be relatively short in length. In the propagation sequence of operation which may be utilized in accordance with this invention, reference domains of the arrows 44 and 48 and informational domains such as shown by the arrows 42 and 46 are alternately recorded. A binary "zero" represented by arrow portions 140 and 142 of elongated arrows 146 and 148 may have the same polarity as a reference domain. Thus, a "zero" provides a single elongated domain when combined with the two adjacent reference domains as shown by the arrows 146 and 148. A binary "one" as shown by arrows 42, 46, 152 and 147 has a polarity opposite to the adjacent reference domains to form magnetic domain walls.

The coil 52 may be positioned between the conductors 20 and 18 so that the end of a cycle of operation, which may be shortly after time $T_4$, a domain wall position is thereat. For example, the reference arrow portion 150 and the "one" arrow 152 establish a domain wall at time $T_4$. If the arrow 152 were reversed as a result of a "zero" being previously recorded, a domain wall would not be present at the coil 52 at time $T_4$ and a "zero" would be interrogated as will be discussed subsequently.

At time $T_4$, reference domains of the arrows 44 and 48 are recorded in the wires 10 and 12. The magnetic domains are propagated one conductor width forward shortly after time $T_4$ in response to the polyphase driving currents of the waveforms 130 and 132 providing current directions through the first four conductor sections of −−++. A + may indicate current flowing into the sections of FIG. 2 and a − may indicate current flowing in a direction out of the sections.

At time $T_1'$, the reference domains of the arrows 44 and 48 are further expanded in response to the record current of the waveform 136. The driving current of the waveform 130 changes polarity to a positive current and the first four conductor sections have current directions indicated by +, −, − and + to propagate all magnetic domain walls one conductor width forward in the wires 10 and 12. At time $T_2'$ in response to the recording current of the waveform 136, the reference domains of the arrows 44 and 48 are further expanded as all magnetic domain walls are propagated one conductor width forward. The driving current of the waveform 132 changes polarity at time $T_2'$ so that the current directions in the first four conductors of FIG. 2 are +, +, — and —.

At time $T_3'$, in response to a positive pulse of the waveform 136, a binary "one" of arrows 156 and 158 is recorded in the wires 10 and 12. The write pulse of the waveform 136 may be initiated by a timing signal (not shown) applied from the source 37 to the write source 32 to control an informational source that may be included in the write source 32. It is to be noted that the recording coil 30 may be positioned between two adjacent conductors 20 and 18 so that the magnetic domains of the arrows 156 and 158 expand to form a second conductor width at time $T_4'$. If the write coil 30 is positioned over only one of the conductors, the write pulse of the waveform 136 must continue for two time periods. If a binary zero is to be recorded at time $T_3'$, the signal of the waveform 136 is maintained at the low level indicated as a dotted line, and a domain is established with the same polarity as the reference domains. At time $T_3'$ the current pulse of the waveform 130 changes direction and the first four conductors have current directions of —, +, + and — to propagate all domain walls one conductor width forward.

At time $T_4'$, the currents of the waveforms 130 and 132 change to a condition similar to that of time $T_4$ to again propagate the domain walls and the domains one conductor width forward. The recorded "one" domains of the arrows 156 and 158 are expanded to a full length of two conductor widths at time $T_4'$. The propagation and recording operation continues in a similar manner and will not be explained in further detail.

The timing of the propagation operation is selected so that a domain wall between a reference domain and a "one" domain is adjacent to the coil 52 at time $T_4$. Also, if a "zero" is present, a central portion of a magnetic domain is adjacent to the coil 52 such as between the arrow portions 140 and 151 in the wire 10 and between the arrow portions 142 and 153 in the wire 12 at time $T_4'$ which is the condition when the domains are propagated one conductor width forward from that shown at time $T_3'$. It is assumed that the register is filled and the propagation operation is terminated at the end of a cycle. It is to be noted that the coil 52 may have other positions such as at the opposite end of the "one" domain of the arrow 152 at time $T_4$.

Now that the serial propagation of domains into the register has been explained, the static reading operation in accordance with this invention will be explained in further detail. The magnetic domains are maintained in fixed positions at the end of a cycle such as at time $T_4$ and it is desired to interrogate the information stored adjacent to a static read coil such as the coil 52. In response to a sampling pulse of a waveform 162 on the lead 47, the switch 57 is closed and an AC signal (not shown) is applied to the lead 46 and through the leads 48 and 50 of the coil 52 to ground. The resonant circuit 64 is tuned to the frequency of the oscillator 56 and the transistors 68 and 90 operate in the linear region of current versus base voltage. If a small impedance is present in the coil 52 to constant AC current flow, the signal of a waveform 61 has a relatively small amplitude indicating the absence of a domain wall at the coil 52. Thus, when this low amplitude signal is amplified by the operation of the transistors 68 and 90, the detected signal of a waveform 163 at a first end of the winding 112 has a low voltage level as indicated by the detected low level portion of a waveform 164.

However, the domain wall developed by the arrows 150 and 152 and the arrows 145 and 147 provides a large impedance or inductance to current flow so that the AC signal of the waveform 61 has a relatively large amplitude. When the large amplitude signal of the waveform 61 is amplified, the voltage amplitude of the waveform 163 rises at the winding 112 and after detection, an increased voltage of the waveform 164 is applied to the lead 122. Thus, during the period of the sampling pulse of the waveform 162 after time $T_4$, a high level signal of the waveform 164 is sensed by the utilization system 124 as a stored binary "one" has been interrogated. If the AC current is supplied from the source 56 through the capacitor 62 having a value chosen to resonate with the high effective inductance of a domain wall, but to be off resonance when the inductance is low in the absence of a domain wall, the discrimination between the two conditions is enhanced. The output voltage will increase more rapidly than from only the impedance change. The ratio to be expected is in proportion to the Q of the system. However, as is well known in the art, if the Q is very high, that is, the dissipation factor is very low, the rate of change of the signal will be restricted. It should be noted that when the source of AC signals 56 operates at very high frequencies and as a constant AC current source, the signal of the waveform 61 has relatively high voltage amplitudes in response to the presence of a domain wall because of the more rapid flux excursions.

Referring now also to FIG. 4, the presence of a magnetic domain wall such as between the arrows 150 and 152 representing a stored binary "one" causes magnetic lines of flux 166 and 168 to pass into the air or space and back into the wire 10 at opposite ends of the respective magnetic domains of the arrows 150 and 152. At the lower portion of the wire 10, lines of flux 172 and 174 pass through the air to the magnetic domains indicated by the respective arrows 145 and 147. Similar lines of flux pass out of the wires 10 and 12 and into the air from all sides thereof. In response to a positive half cycle of the AC signal similar to the waveform 61 (FIG. 1) fields indicated by flux lines 176 and 178 are formed in the wire 48 and fields indicated by lines of flux 180 and 182 are formed in the wire 50. Similar fields indicated by a line of flux 177 are formed around the wire 46. Fields are formed around the wires 46, 48 and 50 of the opposite polarity in response to the negative half cycle of the waveform 61.

The alternating field from the sensing conductor or coil 52 causes the position of the poles forming the domain walls to shift slightly in synchronism with the field because at the wall the molecular magnetic elements are twisted from their normal position of orientation to a less stable attitude at an angle to the orientation. Those molecular elements at the domain wall which are near 90 degrees from normal orientation are most susceptible to disturbance. Thus, small AC field can cause these critically positioned molecular elements to swing back and forth causing their fields to swing and adding to the flux induced in air by the AC and the induced voltage in the exciting wire or coil 52. When no domain wall is present the molecular magnets are in a stable position aligned with the major component of the AC field. Therefore, the molecular magnets experience little or no torque and do not swing. In this circumstance flux is not added to the air induced flux resulting from the AC current. Thus, the current passing through the lines 46, 48 and 50 develop alternating fields which are opposed by the lines of flux such as 166 and 168 resulting from the magnetic domain walls. Similar inductive opposition is provided by fields passing into the lower portion and side portions of the wire 12. In response to a second half cycle of the AC signal of the waveform 61 the field directions of the lines 176, 178, 180 and 182 reverse and a similar inductive impedance is applied to the current flowing through the leads 46, 48 and 50.

However, if at the end of a cycle such as at time $T_4'$ a domain wall is not present at the coil 52, substantially the majority of the lines of flux in the wires 10 and 12 are enclosed therein and relatively few are passing through the air at the position of the coil 52 because the molecular magnets are aligned with the axis of the wire. Thus the changing fields indicated by the flux lines 176, 177, 178, 180 and 182 cut very few lines of flux passing into or from the air of the wires 10 and 12. Therefore a relatively small impedance is provided and the signal of the waveform 61 has a relatively low amplitude. After amplification, a relatively low amplitude rectified signal of the waveform 164 is applied to the utilization circuit 124. As shown by the waveform 164 of FIG. 3 a low level signal is applied to the lead 122 indicated by the solid portion thereof when the switch 57 is closed in response to the sampling pulse of the waveform 162. It is to be noted that in the example shown, a binary "one" and a "zero" are sensed dependent upon which cycle of operation the propagation was terminated. The register may also be sampled at the end of a fixed number of propagation cycles representing a filled memory. Also, in accordance with this invention, a plurality of sensed coils such as 52 may be utilized to sample or interrogate stored information at desired points within the shift register.

Figure 5:
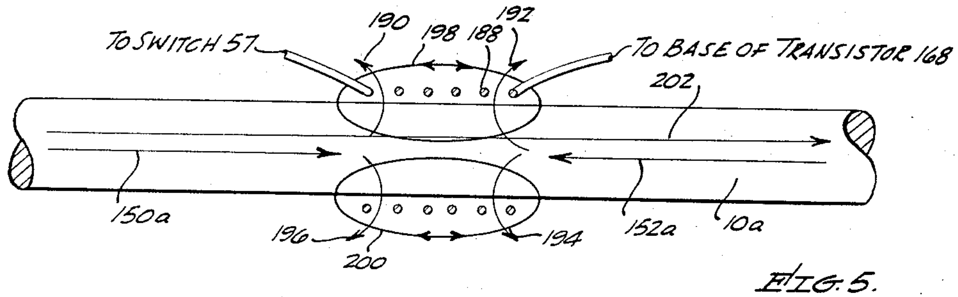
FIG. 5 is a plan drawing of another arrangement of the static sense coil with a single magnetic storage wire in accordance with the invention.

Referring now to FIG. 5, another arrangement in accordance with the invention may include a coil 188 wound in a continuous helix around a single magnetic medium such as a wire 10*a*. The relation of the coil 188 relative to the conductors 18 and 20 may be similar to that shown in FIG. 7. With a single magnetic wire, the propagation operation is similar to that discussed above except complementary magnetic domains in a second magnetic wire are not utilized. The coil 188 may have one end coupled to the switch 57 of FIG. 1 and the other end coupled to the base of the transistor 68. When a binary "one" is stored at the position of the coil 188, magnetic domains 150*a* and 152*a* provide a magnetic domain wall thereat. Thus magnetic lines of flux pass from the wire 10*a* as indicated by lines 190, 192, 194 and 196. The field developed by the AC current passing through the coil 188 which alternately changes in polarity is indicated by lines 198 and 200. Thus, because of the presence of the magnetic domain wall, fields developed by the current passing through the coil 188 cuts lines of flux such as 190, 192, 194 and 196 to develop an inductive impedance to AC current flow through the coil. Similar to the discussion relative to FIG. 1, in response to a high impedance, a relatively high voltage of the waveform 61 is applied to the amplifier 64 and a high level rectified signal of the waveform 164 is applied to the lead 122.

However if a binary "zero" is stored at the position of the coil 188 as indicated by an arrow 202 which, for example, may occur after time $T_4'$ as discussed relative to FIG. 3, substantially few lines of flux are present in the air or space from the magnetic state of the wire 10*a*. Thus alternating current passing through the coil 188 is opposed wtih a relatively small inductive impedance and the amplitude of the signal of the waveform 61 is relatively low. As a result a relatively low voltage of the waveform 164 is detected and applied through the lead 122 to the utilization system 124 of FIG. 1.

Figure 6:
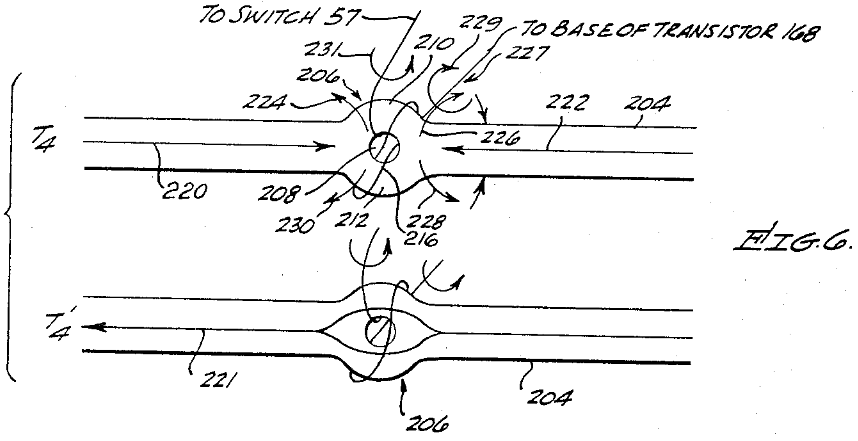
FIG. 6 is a plan drawing showing another arrangement of a magnetic medium in accordance with the invention for explaining the static sensing of the presence or absence of domain walls.

Referring now principally to FIG. 6 another static readout arrangement in accordance with this invention may include a longitudinally oriented magnetic medium or ribbon 204 having an enlarged portion 206 with a hole 208 therein at a similar position as the coil 52 relative to the propagating conductors as shown in FIG. 2. The magnetic ribbon 204 thus has first and second paths 210 and 212 around the hole 208 substantially adjacent to the cross sectional area of the bulk of the ribbon 204. A coil 216 may be wound around the enlarged portion 206 and through the hole 208 so as to pass current in opposite directions around the paths 210 and 212. At time $T_4$ when a binary "one" indicated by arrows 220 and 222 is stored on both sides of the enlarged portion 206, lines of flux 224, 226, 228 and 230 pass from the domain wall of the ribbon 204 into the air and back into the ribbon 204 at opposite ends of the arrows 220 and 222. Thus AC current applied to the coil 227 develops alternating fields of flux lines 229 and 231 and cuts the lines of flux 224, 226, 228 and 230 to develop an inductive impedance. As a result the AC signal applied to the amplifier circuit 64 is amplified to a relatively high amplitude signal and a high amplitude rectified voltage of the waveform 164 representing a stored binary "one" is applied to the utilization system 124.

After time $T_4'$ when a zero is stored adjacent to the coil 227 as indicated by the domain arrow 221, substantially few lines of flux emanate from or pass into the ribbon 204. Thus in response to the closing of the switch 57 of FIG. 1 a relatively small inductive impedance is presented to the alternating current passing through the coil 227. The relatively low voltage of the waveform 164 may be applied to the utilization system 124 shortly after time $T_4'$ as determined by the sampling pulse of the waveform 162. It is to be noted that the enlarged section 206 and the ribbon 204 has the advantage that when a magnetic domain wall is stored thereat, increased lines of flux are provided substantially at right angles to the field developed by the current in the coil 227 so that a highly sensitive arrangement is provided. The enlarged section 206 provides two magnetic paths for presenting a relatively large inductance to current flow through the coil 227 when a binary "one" is present.

Figure 7:
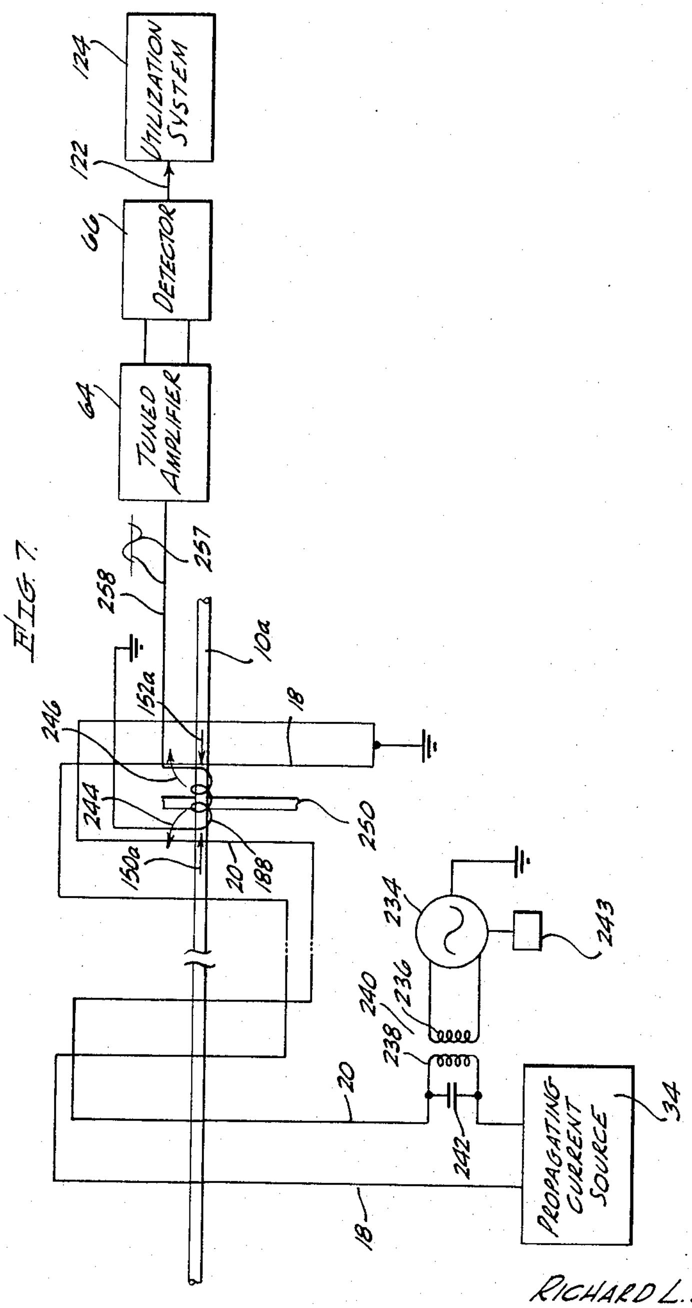
FIG. 7 is a partially perspective schematic drawing showing other arrangements in accordance with the invention for applying the alternating signal to the magnetic storage wire.

Referring now to FIG. 7, another arrangement in accordance with this invention may apply the AC signal to the propagating conductors rather than to one end of the sense coil. The single magnetic medium or wire 10*a* may be utilized adjacent to the propagating conductors 18 and 20 which are shown in FIG. 7 as lines for convenience of illustration. The sense coil 188 may be positioned between the conductors 20 and 18 similar to the arrangement shown in FIG. 1. An AC source or oscillator 234 may be coupled through windings 236 and 238 of a transformer 240 to the conductor 20. The oscillator 234 may have a selected frequency of 50 kilocycles to 10 megacycles so as to be at a substantially higher frequency than that of the propagation pulses. One end of the winding 238 may be coupled to the conductor 20 and the other end may be coupled to the source of propagating current 34. A capacitor 242 may be coupled across the winding 238. Thus, an AC signal is applied to the conductor 20 to vibrate, oscillate or shift the magnetic domain walls short distances back and forth along the wire 10*a*. The frequency of the AC signal is sufficiently high and the amplitude is sufficiently low to prevent any permanent positional change of the magnetic domains 150*a* and 152*a* which may represent a stored binary "one." The alternating movement of the fields emanating from the domain wall (representing a stored "one") as indicated by flux lines 244 and 246 induces AC voltages of a waveform 257 in the coil 188 which are applied to a lead 258 and to the base of the transistor 68 of the tuned amplifier 64. These AC signals are amplified in the tuned amplifier 64, detected as a voltage rise and applied to the utilization system 124 to represent an interrogated binary "one." A timing control 243 may be coupled to the source 234 to control the time of static read-out similar to that of FIG. 1.

If a "zero" is stored adjacent to the coil 188 such as at time $T_4'$ as discussed relative to FIG. 3, a domain wall is not present and a relatively small or substantially no AC signal is sensed by the coil 188 and applied to the lead 258. Thus a low voltage signal similar to the waveform 164 of FIG. 3 is detected and applied to the utilization system 124 to represent an interrogated "zero."

Also, in accordance with the invention, a separate conductor wire 250 adjacent to the magnetic wire 10*a* may be utilized to apply the AC signal to the magnetic domain walls in directions parallel to the longitudinal axis of the wire 10*a*. In this arrangement, the oscillator 234 is coupled to the wire 250 in a suitable manner instead of to a conductor such as 18 or 20.

It is to be noted that the arrangements in accordance with this invention are not to be limited to a single static sense coil, but a plurality of sense coil arrangements may be provided at selected positions along the wire or wires in accordance with the principles of this invention. The carrier frequency detection arrangement in accordance with this invention, may be utilized to provide parallel outputs from a number of digit positions along the storage medium of a shift register.

Thus, there has been described a system for providing static read-out of binary information stored in a magnetic medium. In a shift register system the information may be interrogated without propagation and without destruction of the stored information. The difference in impedance at the measuring point is utilized to indicate whether a binary "one" which may be the presence of a domain wall or a "zero" which may be the absence of a domain wall is stored thereat. The system in accordance with this invention is highly useful for providing random access or sampling of information stored within a large storage system.

What is claimed is:

1. A binary reading system comprising a magnetic medium in which magnetic domain walls are positioned, coil means positioned adjacent to said magnetic medium, a source of alternating current coupled to said coil means and having a selected frequency, and resonant means coupled to said coil means for responding to a signal developed by said source of alternating current responding to an impedance at said coil developed by the presence or absence of a magnetic domain wall thereat.

2. A system for sensing the presence or absence of a magnetic domain wall at a selected position along a magnetic medium comprising a coil positioned adjacent to said magnetic medium at the selected position, propagating means magnetically coupled to said magnetic medium, a source of alternating signals coupled to said propagating means, and means coupled to said coil for sensing a first impedance in said coil for the presence of a magnetic domain wall and a second impedance in said coil for the absence of a domain wall.

3. A static readout device for a shift register system in which a series of magnetic domains are arranged alternately with a domain of a first polarity and with a domain of a selected first or second polarity, the adjacent domains of first and second polarities forming a domain wall representative of a first binary state, the absence of a domain wall of the adjacent domains of first polarities representative of a second binary state, the magnetic domains being propagated into and positioned in a magentic wire comprising a coil positioned adjacent to said magnetic wire, a source of AC signals coupled to said coil, capacitive means coupled to said coil and tuned with the effective inductance developed in said coil when a domain wall is adjacent thereto, the tuning changing in response to the absence of a magnetic domain wall at said coil, and detecting means coupled to said coil to provide a signal representative of the first or second binary states.

4. A shift register system in which binary information represented by the presence or absence of a magnetic domain wall may be statically read therefrom comprising first and second propagating conductors, a magnetic wire positioned adjacent to said propagating conductors, a source of propagating pulses coupled to said first and second propagating conductors, a source of alternating signals coupled to said first of said propagating conductor, coil means positioned adjacent to said magnetic wire at a position between said first and second propagating conductors, and detecting means coupled to said coil means, whereby a domain wall vibrates in response to an alternating signal to induce a relatively high amplitude alternating signal in said coil means, the absence of a domain wall inducing a relatively low amplitude alternating signal in said coil means, said detecting means responding to the alternating signals to indicate the presence or absense of a magnetic domain wall.

5. A magnetic shift register system comprising a magnetic wire, means for propagating magnetic domains in a repetitive cycle into a magnetic wire, said magnetic domains alternately being a reference domain of a first magnetic polarity and an informational domain of a selected first or second magentic polarity respectively representative of a first or a second binary state, a coil positioned adjacent to the magnetic wire at a selected location so that the position between a reference domain and an informational domain is thereat at the end of each cycle, means coupled to said magetic wire for applying an alternating signal to disturb a magnetic domain adjacent to said coil, and frequency sensitive means coupled to said coil, said coil sensing a relatively large signal when a reference domain and an informational domain of a second polarity join thereat and sensing a relatively small signal when a reference domain and an informational domain of a first polarity are adjacent to said coil, said frequency sensitive means responding to the signals sensed by said coil to develop signals representative of the first or second binary states.

6. In a magnetic shift register in which magnetic domains are propagated in a repetitive cycle into a magnetic wire, said magnetic domains alternately being a reference domain of a first magnetic polarity and an informational domain of a selected first or second magnetic polarity respectively representative of a first or a second binary state, a combination comprising a coil positioned adjacent to the magnetic wire at a selected location so that the position between a reference domain and an informational domain is thereat at the end of each cycle, a source of alternating signals, timing means coupled between said source of alternating signals and said coil to apply signals to said coil at the end of a repetitive cycle, and frequency sensitive means coupled to said coil, said coil sensing a relatively large inductance when a reference domain and an informational domain of a second polarity join thereat and sensing a relatively small inductance when reference domain and informational domain of a first polarity are adjacent to said coil, said frequency sensitive means responding to the inductance developed by said coil to develop signals representative of the first or second binary states.

7. In a magnetic shift register in which magnetic domains are propagated in a repetitive cycle into first and second parallel magnetic wires and stored therein, said magnetic domains in said first wire alternately being a reference domain of a first magnetic polarity and an informational domain of a selected first or second magnetic polarity and in said second wire alternately being a reference domain of a second magnetic polarity and an informational domain of a selected first or second polarity, a combination comprising a resonant circuit including a coil positioned between the magnetic wires at a selected position so that the position between a reference domain and an informational domain is thereat at the end of each cycle, a source of alternating signals coupled to said resonant circuit, and frequency sensitive means coupled to said resonant circuit, said coil sensing a relatively large inductance when a reference domain and an informational domain of a second polarity join thereat in said first wire and a reference domain and an informational domain of a first polarity join thereat in said second wire and sensing a relatively small inductance when a reference domain and an informational domain of a first polarity are adjacent to said coil in said first wire and a reference domain and an informational domain of a second polarity are adjacent to said coil in said second wire, said frequency sensitive means responding to the inductance developed by said coil.

8. A shift register system comprising
an elongated magnetic medium,
means coupled to said magnetic medium for storing magnetic domains alternately as a reference domain of a first magnetic polarity and an informational domain of a selected first or second magnetic polarity.

first and second propagating conductors positioned adjacent to said magnetic medium, a source of polyphase propagating pulses coupled to said first and second propagating conductors for propagating said magnetic domain walls along said medium in cycles of pulses, a coil coupled to said magnetic medium at a selected position therealong so that the position between a reference domain and an informational domain is thereat at the end of each cycle, a source of alternating current signals coupled to said first propagating conductor for disturbing the magnetic flux at magnetic domain walls between a reference domain and an informational domain of a second magnetic polarity, said coil responding to the presence of a domain wall and the signals from said source to develop a signal representative of the presence of a domain wall, and sensing means coupled to said coil to respond to said signal representative of the presence of a domain wall.

References Cited

UNITED STATES PATENTS

| | | | |
|---|---|---|---|
| 3,114,009 | 12/1963 | Camras et al. | 179—100.2 |
| 3,068,453 | 12/1962 | Broadbent | 340—174 |
| 3,092,813 | 6/1963 | Broadbent. | |
| 3,151,316 | 9/1964 | Bobeck | 340—174 |

BERNARD KONICK, *Primary Examiner.*

IRVING SRAGOW, *Examiner.*

P. SPERBER, H. D. VOLK, *Assistant Examiners.*